US011200431B2

(12) United States Patent
Fowe

(10) Patent No.: US 11,200,431 B2
(45) Date of Patent: Dec. 14, 2021

(54) METHOD AND APPARATUS FOR PROVIDING LANE CONNECTIVITY DATA FOR AN INTERSECTION

(71) Applicant: HERE GLOBAL B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 245 days.

(21) Appl. No.: 16/412,100

(22) Filed: May 14, 2019

(65) Prior Publication Data

US 2020/0364469 A1 Nov. 19, 2020

(51) Int. Cl.
*G06K 9/00* (2006.01)
*G01C 21/32* (2006.01)
*G06F 16/29* (2019.01)
*G08G 1/01* (2006.01)
*G08G 1/0967* (2006.01)

(52) U.S. Cl.
CPC ......... *G06K 9/00798* (2013.01); *G01C 21/32* (2013.01); *G06F 16/29* (2019.01); *G08G 1/0141* (2013.01); *G08G 1/096783* (2013.01)

(58) Field of Classification Search
CPC .... G06K 9/00798; G06F 16/29; G01C 21/32; G01C 21/3867; G01C 21/3815; G08G 1/0141; G08G 1/096783
See application file for complete search history.

(56) References Cited

U.S. PATENT DOCUMENTS 9,341,485 B1 5/2016 Weiland et al.
2016/0102986 A1 4/2016 Ma et al.
(Continued)

FOREIGN PATENT DOCUMENTS

DE 102017209346 A1 1/2019
EP 3293489 A1 3/2018
WO 2018219522 A1 12/2018

OTHER PUBLICATIONS

Liu et al., "Generating Enhanced Intersection Maps for Lane Level Vehicle Positioning Based Applications", published in Procedia—Social and Behavioral Sciences 96, Nov. 2013, pp. 2395-2403.
(Continued)

*Primary Examiner* — Mussa A Shaawat
(74) *Attorney, Agent, or Firm* — Ditthavong, Steiner & Mlotkowski

(57) ABSTRACT

An approach is provided for providing lane-level connectivity data at an intersection. The approach involves, for example, retrieving probe data for an intersection with at least one upstream road link and at least one downstream link. The approach also involves performing a lane-level map-matching of the probe data to one or more upstream lanes of the at least one upstream road link, one or more downstream lanes of the at least one downstream link, or a combination thereof. The approach further involves generating a junction matrix for the intersection between the one or more upstream lanes of the at least one upstream road link and the one or more downstream lanes of the at least one downstream road link based on the lane-level map-matching of the probe data. The approach further involves determining lane-connectivity data for the intersection based on the junction matrix.

20 Claims, 13 Drawing Sheets

(56) References Cited

U.S. PATENT DOCUMENTS

| | | | |
|---|---|---|---|
| 2017/0089717 A1* | 3/2017 | White | G01C 21/3492 |
| 2018/0164811 A1* | 6/2018 | Yoo | G05D 1/0088 |
| 2018/0237019 A1 | 8/2018 | Goto et al. | |
| 2018/0240335 A1* | 8/2018 | Dong | G08G 1/056 |
| 2018/0242392 A1* | 8/2018 | Liu | H04L 45/125 |
| 2019/0007484 A1* | 1/2019 | Chen | H04W 4/40 |
| 2019/0103019 A1* | 4/2019 | Fowe | G01S 19/42 |
| 2019/0120640 A1* | 4/2019 | Ho | G06Q 50/30 |
| 2019/0132709 A1* | 5/2019 | Graefe | H04W 4/38 |
| 2019/0279247 A1* | 9/2019 | Finken | G06F 21/602 |
| 2019/0311298 A1* | 10/2019 | Kopp | G06K 9/6256 |
| 2019/0327588 A1* | 10/2019 | Gong | H04W 4/44 |
| 2019/0361439 A1* | 11/2019 | Zeng | G06K 9/00791 |
| 2019/0383626 A1* | 12/2019 | Fowe | G08G 1/0112 |
| 2020/0003861 A1* | 1/2020 | Eriksson | B60R 21/0134 |
| 2020/0019815 A1* | 1/2020 | Balu | G06F 21/6218 |
| 2020/0120458 A1* | 4/2020 | Aldana | H04W 72/048 |
| 2020/0124439 A1* | 4/2020 | Fowe | G01C 21/3658 |
| 2020/0132476 A1* | 4/2020 | Roeth | G06T 5/002 |
| 2020/0158530 A1* | 5/2020 | Xu | G08G 1/0116 |
| 2020/0200558 A1* | 6/2020 | Xu | G08G 1/096822 |
| 2020/0211399 A1* | 7/2020 | Zhang | G08G 1/096725 |
| 2020/0219399 A1* | 7/2020 | Pfeifle | G06N 3/0454 |

OTHER PUBLICATIONS

Zhang et al., "Data Modeling Method Based on Cad Intersection and Its Application", International Journal of Modeling and Optimization, vol. 5, No. 2, Apr. 2015, pp. 109-113.

Tang et al., "Lane-level Road Information Mining from Vehicle GPS Trajectories Based on Naive Bayesian Classification", Article, Published in ISPRS International Journal of Geo-information, Nov. 26, 2015, vol. 4. pp. 2260-2680.

Office Action for European Patent Application No. 20174762.3-1001, dated Oct. 7, 2020, 8 pages.

* cited by examiner

FIG. 4

| | Downstream Link 403-Ln1 | Downstream Link 403-Ln2 | Downstream Link 405-Ln1 | Downstream Link 405-Ln2 | Downstream Link 407-Ln1 | Downstream Link 407-Ln2 |
|---|---|---|---|---|---|---|
| Upstream Link 401-Ln1 | 0 | 0 | 1 | 0 | 8 | 6 |
| Upstream Link 401-Ln2 | 0 | 0 | 6 | 8 | 0 | 1 |
| Upstream Link 401-Ln3 | 8 | 2 | 0 | 1 | 0 | 0 |
| Upstream Link 401-Ln4 | 2 | 8 | 0 | 0 | 0 | 0 |

400

METHOD AND APPARATUS FOR PROVIDING LANE CONNECTIVITY DATA FOR AN INTERSECTION

BACKGROUND

Navigation and mapping service providers are continually challenged to provide digital maps of increasing levels of granularity to support advanced applications such as autonomous driving. For example, data on traffic flow and direction through intersections can provide data for safely routing autonomous and/or other vehicles through those intersections. Safe operations generally require the map data to provide at least a lane-level granularity (e.g., so that navigation systems can generate lane-level routing). However, service providers face significant technical challenges to provide lane-level map data due, for instance, to the resources needed to collect lane-level data, and/or location sensor accuracy limitations and errors traditionally used to generate map data.

SOME EXAMPLE EMBODIMENTS

Therefore, there is a need for automatically determining lane-connectivity at intersections based on lane-level traffic (e.g., as determined from vehicle probe or trajectory data).

According to one embodiment, a method comprises retrieving probe data for an intersection with at least one upstream road link and at least one downstream link. The method also comprises performing a lane-level map-matching of the probe data to one or more upstream lanes of the at least one upstream road link, one or more downstream lanes of the at least one downstream link, or a combination thereof. The method further comprises generating a junction matrix for the intersection between the one or more upstream lanes of the at least one upstream road link and the one or more downstream lanes of the at least one downstream road link based on the lane-level map-matching of the probe data. The method further comprises determining lane-connectivity data for the intersection based on the junction matrix. In one embodiment, the junction matrix categorizes and/or provides characteristics of vehicle trajectories in the probe data according to possible combinations of the upstream lanes and the downstream lanes.

According to another embodiment, an apparatus comprises at least one processor, and at least one memory including computer program code for one or more computer programs, the at least one memory and the computer program code configured to, with the at least one processor, cause, at least in part, the apparatus to retrieve probe data for an intersection with at least one upstream road link and at least one downstream link. The apparatus is also caused to perform a lane-level map-matching of the probe data to one or more upstream lanes of the at least one upstream road link, one or more downstream lanes of the at least one downstream link, or a combination thereof. The apparatus is further caused to generate a junction matrix for the intersection between the one or more upstream lanes of the at least one upstream road link and the one or more downstream lanes of the at least one downstream road link based on the lane-level map-matching of the probe data. The apparatus is further caused to determine lane-connectivity data for the intersection based on the junction matrix. In one embodiment, the junction matrix categorizes and/or provides characteristics of vehicle trajectories in the probe data according to possible combinations of the upstream lanes and the downstream lanes.

According to another embodiment, a computer-readable storage medium carries one or more sequences of one or more instructions which, when executed by one or more processors, cause, at least in part, an apparatus to perform retrieving probe data for an intersection with at least one upstream road link and at least one downstream link. The apparatus is also caused to perform performing a lane-level map-matching of the probe data to one or more upstream lanes of the at least one upstream road link, one or more downstream lanes of the at least one downstream link, or a combination thereof. The apparatus is further caused to perform generating a junction matrix for the intersection between the one or more upstream lanes of the at least one upstream road link and the one or more downstream lanes of the at least one downstream road link based on the lane-level map-matching of the probe data. The apparatus is further caused to perform determining which of the one or more upstream lanes flows traffic into which of the one or more downstream lanes. In one embodiment, the junction matrix categorizes and/or provides characteristics of vehicle trajectories in the probe data according to possible combinations of the upstream lanes and the downstream lanes.

According to another embodiment, an apparatus comprises means for retrieving probe data for an intersection with at least one upstream road link and at least one downstream link. The apparatus also comprises means for performing a lane-level map-matching of the probe data to one or more upstream lanes of the at least one upstream road link, one or more downstream lanes of the at least one downstream link, or a combination thereof. The apparatus further comprises means for generating a junction matrix for the intersection between the one or more upstream lanes of the at least one upstream road link and the one or more downstream lanes of the at least one downstream road link based on the lane-level map-matching of the probe data. The apparatus further comprises means for determining lane-connectivity data for the intersection based on the junction matrix. In one embodiment, the junction matrix categorizes and/or provides characteristics of vehicle trajectories in the probe data according to possible combinations of the upstream lanes and the downstream lanes.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram illustrating an example lane-connectivity junction matrix (LCJM), according to one embodiment;

DESCRIPTION OF SOME EMBODIMENTS

Examples of a method, apparatus, and computer program for providing lane connectivity data at an intersection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
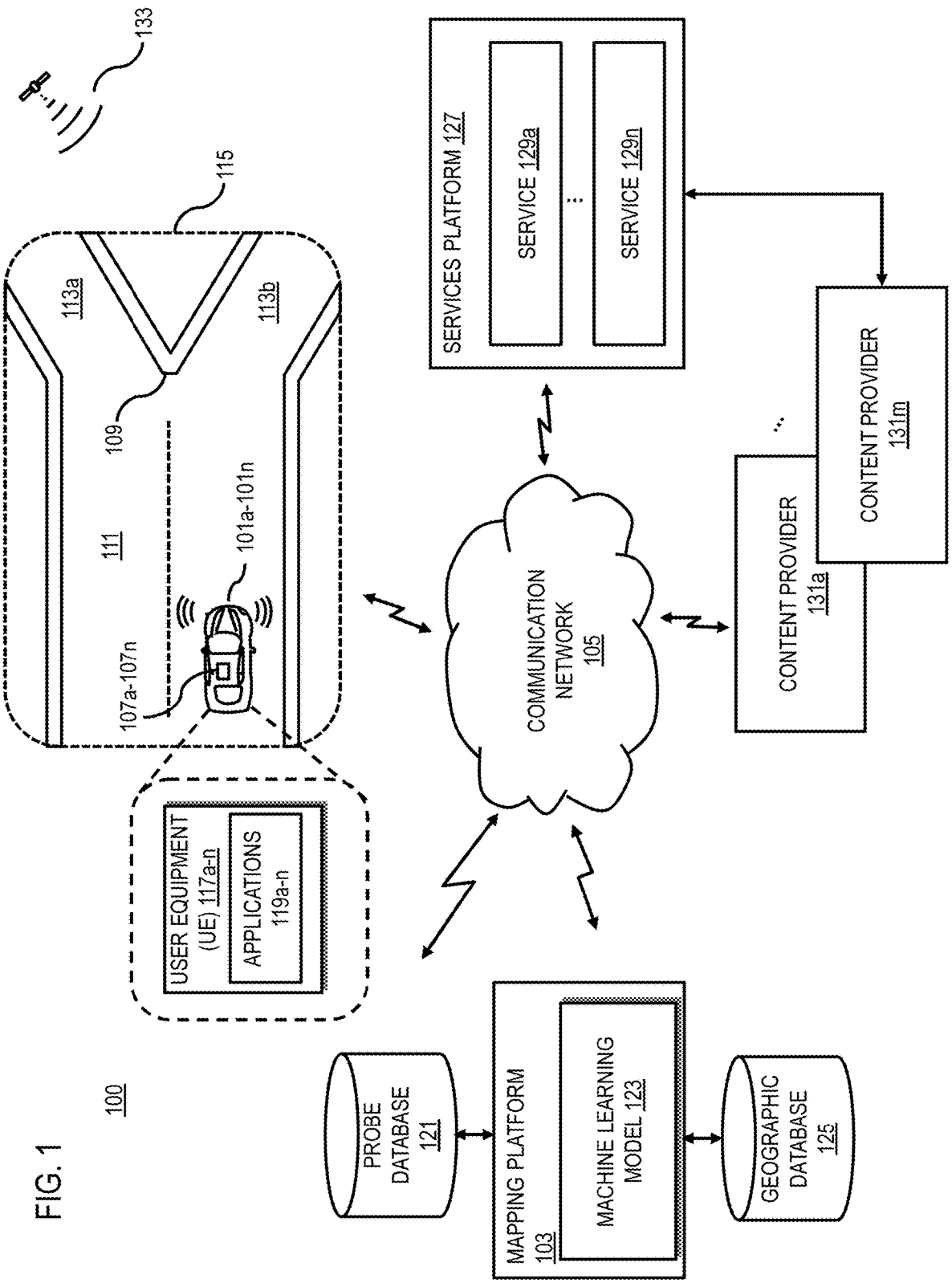
FIG. 1 is a diagram of a system capable of providing lane-level connectivity data at an intersection, according to one embodiment.

FIG. 1 is a diagram of a system capable of providing lane connectivity data at an intersection, according to one embodiment. As discussed above, advanced applications such as autonomous driving often require maps with highly granular resolution (e.g., lane-level granularity or better), particularly at intersections where potentially complex road geometries may occur and cause issues for safe driving. Traditional mapping approaches attempt to approximate lane-level data by looking at the speed divergences and directions of traffic flows on road segments. However, while these traditional approaches may capture speed divergences leading up to an intersection, these approaches do not know or identify the specific lanes of the intersection roads that the traffic speeds are associated with. This is because there is a lack of lane-connectivity data for the intersection (e.g., data indicating which lanes of one road of the intersection connects to which lanes of another road of the intersection).

One problem of this traditional approach, for instance, is that the degree of usefulness of lane-level traffic information is a function of how well map customers (e.g., automobile manufacturers, navigation system provider, etc.) can interpret/translate the traffic speed onto their own maps, such that it can be used for routing and navigation. This problem is illustrated with respect to FIG. 2 which is a diagram 200 illustrating an example of traffic flow data with no lane-connectivity, according to one embodiment. For example, the problem with the traditional approach is that, the approach provides an idea of the average speed per intersection exit direction (e.g., exit direction 201 and exit direction 203), but this approach does identify which specific lane of the upstream road link 205 (road segment just before the intersection 207) is associated to the direction of speed. This level of granularity is important for self-driving or autonomous vehicles, so that while the autonomous vehicle is trying to use the faster lanes, it is also ensuring that the selected lane has a navigable connectivity to the downstream link and direction (e.g., connectivity to one or more lanes of the road segments of the exit directions 201 and 203).

In addition, traditional map data often can be insufficient for determining lane-connectivity data for an intersection (e.g., due to the lack of lane number information, restricted driving maneuvers (RDM), etc.). Also, in many cases, the system 100 does not have enough real-time probes to capture the actual lanes the determined direction-based speeds are associated with. Accordingly, service providers face significant technical challenges to provide lane connectivity data at intersections, particularly in real-time use cases.

To address these technical challenges, the system 100 of FIG. 1 introduces a capability to analyze historical probe data using a lane-connectivity junction matrix (LCJM) to understand lane-connectivity at an intersection a priori and get the lane connectivity data stored in an artifact to use as a reference in real-time to predict the corresponding lanes associated with traffic speeds through the intersection in real-time. In other words, the system 100 processes probe data (e.g., historical vehicle trajectories) to create a LCJM for determining the connectivity data between different lanes of upstream or ingress road links and different lanes of downstream or egress road links of an intersection. The LCJM, for instance, represents probes tracked through ingress and egress (e.g., upstream and downstream) lanes of road links forming an intersection. The LCJM captures probe characteristics such as probe counts, average speed, etc. for each pair of ingress and egress lanes of the intersection. In one embodiment, the lane-connectivity data resulting from the LCJM identifies one or more corresponding lanes of egress links for each lane of the ingress links that have has been traversed by a probe trajectory (e.g., indicating that a specific probe vehicle or device has traveled between a specific pair of ingress and egress lanes). The lane-connectivity data can then be generated and stored in an artifact (e.g., a geographic database 125 or equivalent). In one embodiment, the system 100 can use the lane-connectivity data to predict the lanes of the ingress and/or egress links that correspond to traffic speeds detected using direction-based traffic (DBT) of real-time probe data.

Figure 2:
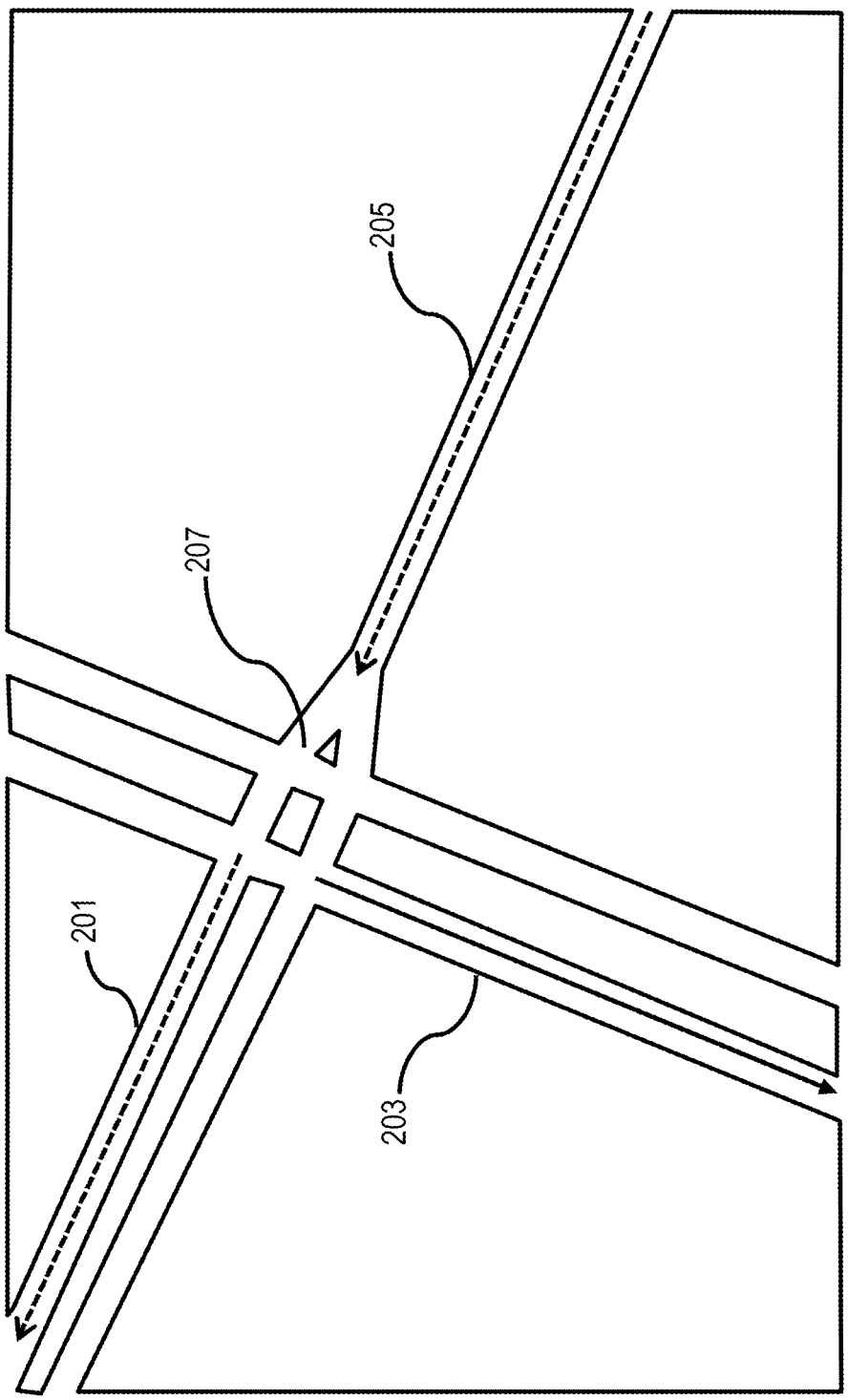
FIG. 2 is a diagram illustrating an example of traffic flow data with no lane-connectivity, according to one embodiment.
Figure 3:
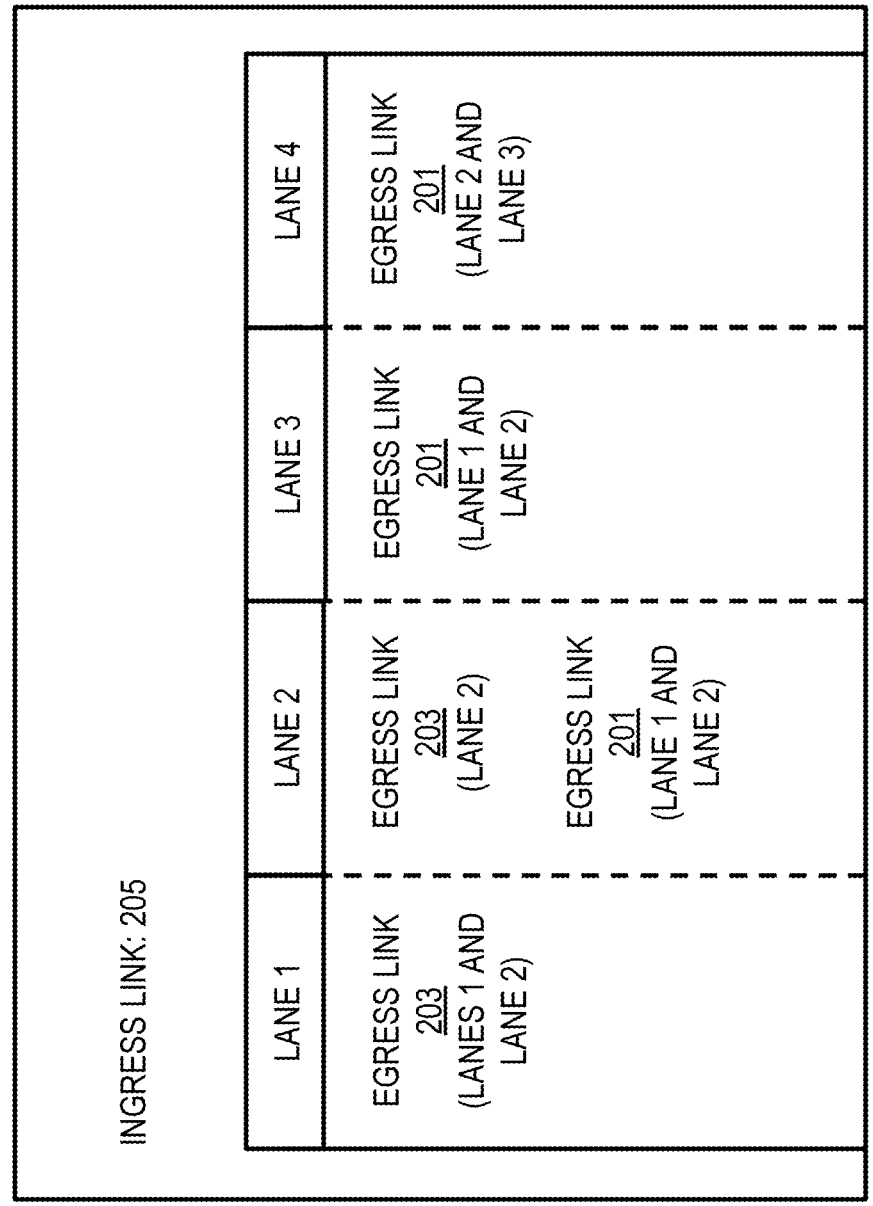
FIG. 3 is a diagram illustrating example lane connectivity data, according to one embodiment.

FIG. 3 is a chart of lane connectivity data 300 for the intersection 207 described in the example of FIG. 2. In this example, the ingress road link 205 of the intersection 207 has four lanes (e.g., indicated in FIG. 3 as Lanes 1-4). Under each lane 1-4 of the link 205, the chart lists the corresponding egress links and/or lanes of the egress links that have been traversed by a threshold number of probe trajectories (e.g., as indicated in the LCJM). As shown, lane 1 of the upstream link 205 has connectivity through intersection 207 with downstream lanes 1 and 2 of downstream link 203. Lane 2 of the upstream link 205 has connectivity through intersection 207 with downstream lane 2 of downstream link 203 and with downstream lanes 1 and 2 of downstream link 201. Lane 3 of the upstream link 205 has connectivity through intersection 207 with downstream lanes 1 and 2 of downstream link 201. Last, lane 4 of the upstream link 205 has connectivity through intersection 207 with downstream lanes 2 and 3 of downstream link 201. In one embodiment, the lane connectivity can be further weighted or characterized according to probe count, average probe speed, and/or the like generated as part of the LCJM.

After the lane connectivity data 300 is generated, the system 100 can use the lane connectivity data 300 to predict which lanes of the intersection 207 correspond to divergent traffic speeds detected from real-time probe data collected from the intersection. For example, the connections between different ingress and egress lanes specified in the lane connectivity data 300 can be correlated to respective traffic speeds indicated in the real-time probe data using a trained machine learning model or any other approach including but not limited to naïve/greedy algorithms using comparison threshold values.

In other words, the system 100 can determine lane-connectivity data at arterial intersections based on a LCJM, according to one embodiment. In one embodiment, the LCJM is a matrix of probe trajectories (e.g., real time and/or historical) between all lanes of all ingress links of a given arterial intersection (upstream) to all lanes of all egress links (downstream). In one instance, the system 100 can use the LCJM as a reference to make predictions in real time of the most probable lane(s) of an upstream link that a vehicle (e.g., an autonomous vehicle) traveled prior to traveling through the intersection to a downstream link or exit. Consequently, the system 100 can generate a robust and complete LCJM that can provide service providers and manufacturers insight for both real-time traffic and map updates.

In one embodiment, the system 100 of FIG. 1 may include one or more vehicles 101a-101n (also collectively referred to as vehicles 101) having connectivity to a mapping platform 103 via the communication network 105. In one instance, the vehicles 101 are configured with one or more location sensors 107a-107n (also collectively referred to herein as location sensors 107) (e.g., a global positioning system (GPS) sensor) to provide the system 100 with the historical and/or real-time probe data collected from the vehicles 101 that are or have traveled through an intersection 109 between one or more ingress roads or links 111 (upstream) and one or more egress roads or links 113 (e.g., 113a and 113b) (downstream) of a digital map 115. In one embodiment, the system 100 can also collect the real-time probe data from one or more user equipment (UE) 117a-117n (also collectively referred to herein as UEs 117) associated with a vehicle 101 (e.g., an embedded navigation system), a user or a passenger of the vehicle 101 (e.g., a mobile device, a smartphone, etc.), or a combination thereof. In one instance, the UEs 117 may include one or more applications 119a-119n (also collectively referred to herein as applications 119) (e.g., a navigation or mapping application). In one embodiment, the probe-data collected by the location sensors 107, the UEs 117, or a combination thereof may be stored in a probe database 121 via the communication network 105.

In one embodiment, to create the LCJM, the system 100 performs a lane-level map matching (LLMM) of the collected probe data (e.g., historical probe data) to one or more upstream lanes of one or more upstream links (e.g., link 111) and/or downstream lanes of one or more downstream links (e.g., links 113a and 113b) of a given intersection 109. In one embodiment, because the location measurement error in the probe data (e.g., GPS error) can be greater than a lane width (making LLMM a technical challenge), the system 100 can use a probabilistic approach or other equivalent approach to perform LLMM. For example, under a probabilistic approach, the system 100 first uses the raw GPS probe positions (e.g., links+latitude (lat) and longitude (lon)) for each probe to create a layer of abstraction over a digital map (e.g., the map 115). In one instance, the system 100 then uses the abstraction layer (<Link-ID>, <d-value>) to generate lane probabilities of probes based on their lateral position (lane distance (d-value)) within a road segment. In one embodiment, the generated lane probabilities form the emission probabilities of a statistical model (e.g., a Hidden Markov Model (HMM)) that the system 100 can use to make an inference of the actual most probable lane(s) a probe trajectory traversed (e.g., one or more lanes of links forming an intersection). In one instance, the system 100 can use a dynamic programming algorithm (e.g., the Viterbi algorithm) to make this inference.

In one embodiment, the system 100 generates a LCJM based on the LLMM of the probe data, as described above. In one instance, the system 100 generates the LCJM as a matrix (e.g., a sparse adjacency matrix) between all lanes of ingress links of a given intersection (upstream) and all lanes of all egress links (downstream) to determine the possible and/or popular navigable connections through the intersection and specifically the various lane-connectivity permutations. In one embodiment, the system 100 can generate a LCJM with each upstream link and lane along the y-axis and each downstream link and lane along the x-axis or vice-versa. As such, each element of the LCJM corresponds to a combination or pair of an originating upstream lane and an ending downstream lane determined from among the one or more upstream lanes and the one or more downstream lanes.

In one embodiment, the system 100 can generate each element of the LCJM such that it consists of a count, an average speed, a standard deviation (STD), an average map-matching confidence (Avg. Confidence), etc. of the corresponding map-matched probe data depending on the intended purpose of the LCJM. For example, it is contemplated that the count metric may help service providers to derive restricted driving maneuvers (RDMs) at the given intersection. Restricted driving maneuvers include maneuvers that are not permitted or allowed at an intersection such as not but limited to left turn restrictions, U-turn restrictions, one-way streets, etc. In addition, the counts or other probe feature determined in the LCJM may also help service providers select the most prominent lanes for determining average speeds. For example, the STD may help service providers to understand the statistical property of the underlining data and it can serve as an input to some machine learning models to make predictions or feature classifications for generating core maps for traffic. As another example, the Average Confidence derived from the confidence metric generated by the LLMM (e.g., reflecting a calculated confidence that a map matching result is a true match) may be used to estimate the viability/accuracy of the LLMM.

FIG. 4 is a diagram illustrating an example LCJM, according to one embodiment. In this instance, the LCJM 300 generated by the system 100 is based on the LLMM of FIG. 2 and each element consists of a probe count (e.g., a vehicle 101). It is noted that probe count is only one example of a matrix element value. In addition or alternatively, other probe characteristics such as but not limited to average speed, standard deviation, average map matching confidence, and/or the like can be computed and included in each matrix element. As shown, the system 100 has created an LCJM 400 for an intersection that includes an upstream link 401 with four lanes, and three downstream links 403-407 with two lanes each. For example, the system 100 determined a probe count between lane 1 of the upstream link 401 (the left-most link) and lanes 1 and 2 of the downstream links 403, 405, and 407, respectively as follows: 0, 0, 1, 0, 8, and 6. Thus, the system 100 can determine based on the LCJM 400 that a vehicle 101 (e.g., an autonomous vehicle) traveling on lane 1 of upstream link 401 through the intersection is most likely to travel on lanes 1 and 2 of downstream link 407, but every once in a while may travel on lane 1 of downstream link 405. It is contemplated that a relatively low probe count such as 1 may represent a driver realizing at the last minute that she/he is driving in the wrong lane for their intended downstream exit and/or direction.

In this example, the system 100 also determined a probe count between lane 2 of the upstream link 401 and lanes 1 and 2 of the downstream links 403, 405, and 407, respectively as follows: 0, 0, 6, 8, 0, and 1. Thus, the system 100 can determine based on the LCJM 400 that a vehicle traveling on lane 2 of upstream link 401 through the intersection is most likely to travel on lanes 1 and 2 of downstream link 405, but every once in a while may travel on lane 2 of downstream link 407. The system 100 further determined in this instance a probe count between lane 3 of the upstream link 401 and lanes 1 and 2 of the downstream links 403, 405, and 407, respectively as follows: 8, 2, 0, 1, 0, 0. Thus, the system 100 can determine based on the LCJM that a vehicle traveling on lane 3 of upstream link 401 through the intersection is most likely to travel on lane 1 of downstream link 403, but in rare instances, may also travel on lane 2 of downstream link 405. Last, the system 100 determined a probe count between lane 4 of the upstream link 401 (the right-most lane) and lanes 1 and 2 of the downstream links 403, 405, and 407, respectively as follows: 2, 8, 0, 0, and 0. Thus, the system 100 can determine based on the LCJM that a vehicle traveling on lane 4 of upstream link 401 through the intersection is most likely to travel on lane 2 of downstream link 403, but in some instances, travels on lane 1 of the downstream link 403.

In one embodiment, the system 100 can use the LCJM to produce and/or store lane-connectivity information in an artifact that the system 100 can then input to a machine learning model (e.g., the machine learning model 123 of the mapping platform 103) to classify real-time traffic speeds through a corresponding intersection. By way of example, the machine learning model 123 may be a support vector machine (SVM), a neural network, decision tree, etc. In one instance, the lane-connectivity information and/or artifact may be stored in or accessible via a geographic data 125. In one embodiment, the system 100 can convert the lane-connectivity information and/or artifact into a format suitable for input into the machine learning model 123 depending on the type of machine learning format being employed by the system 100. Consequently, in one embodiment, the system 100 can use the LCJM as reference in real-time to predict the corresponding lanes associated with the average speeds through a given intersection in real time.

Figure 5:
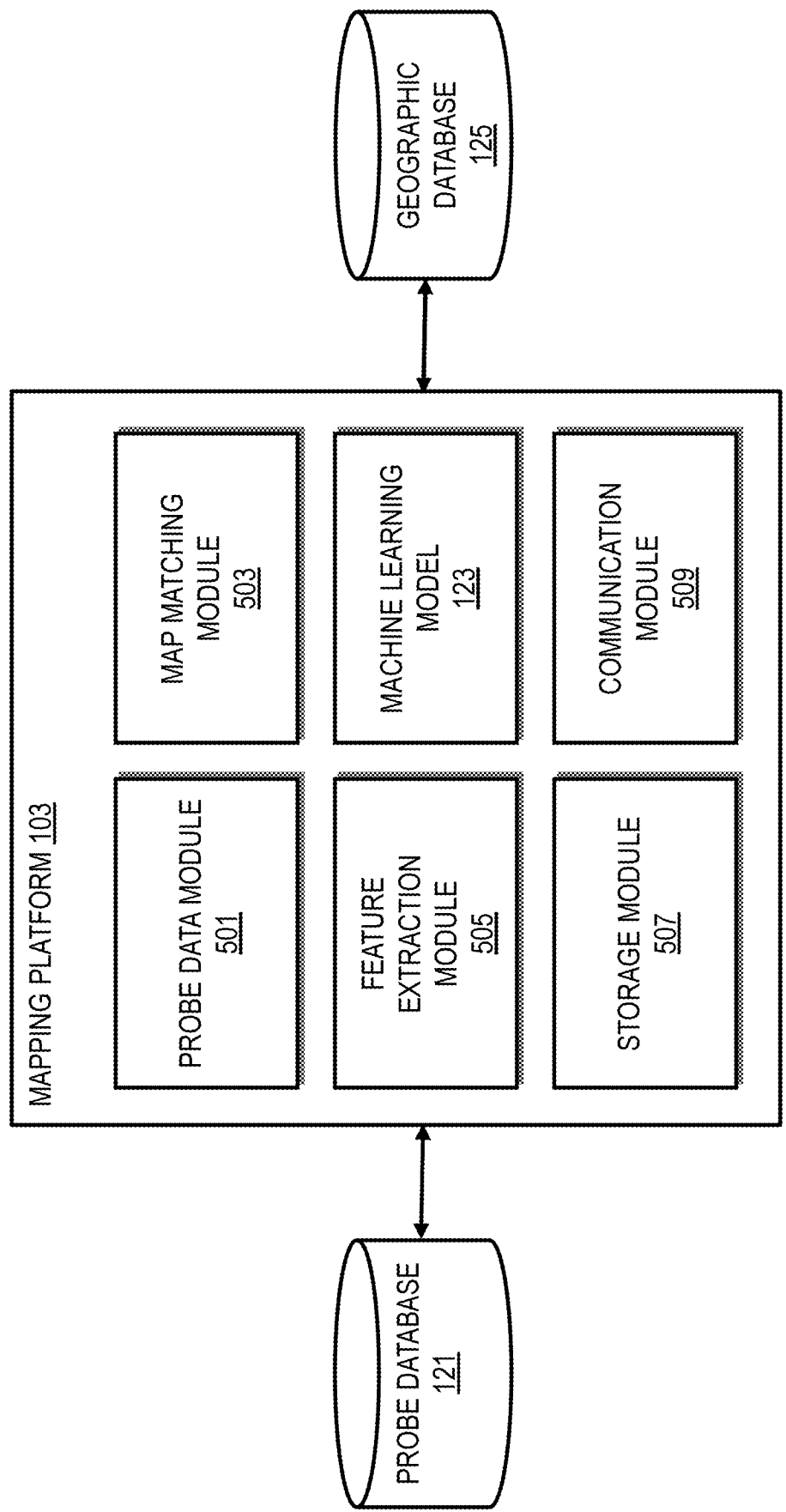
FIG. 5 is a diagram of the components of a mapping platform including a machine learning model, according to one embodiment.

FIG. 5 is a diagram of the components of the mapping platform including a machine learning model, according to one embodiment. By way of example, the mapping platform 103 includes one or more components for predicting lane-connectivity at arterial intersections (upstream and downstream) based on a LCJM. It is contemplated that the functions of these components may be combined in one or more components or performed by other components of equivalent functionality. In one embodiment, the mapping platform 103 includes a probe data module 501, a map matching module 503, a feature extraction module 505, a machine learning model 123, a storage module 507, and a communication module 509 and has connectivity to the probe database 121 and the geographic database 125. The above presented modules and components of the mapping platform 103 can be implemented in hardware, firmware, software, or a combination thereof. Though depicted as separate entities in FIG. 1, it is contemplated that the mapping platform 103 may be implemented as a module of any of the components of the system 100. In another embodiment, the mapping platform 103 and/or one or more of the modules 501-509 may be implemented as a cloud-based service, local service, native application, or combination thereof. The functions of the mapping platform 103, the machine learning model 123 and/or the modules 501-509 are discussed with respect to FIG. 6 below.

Figure 6:
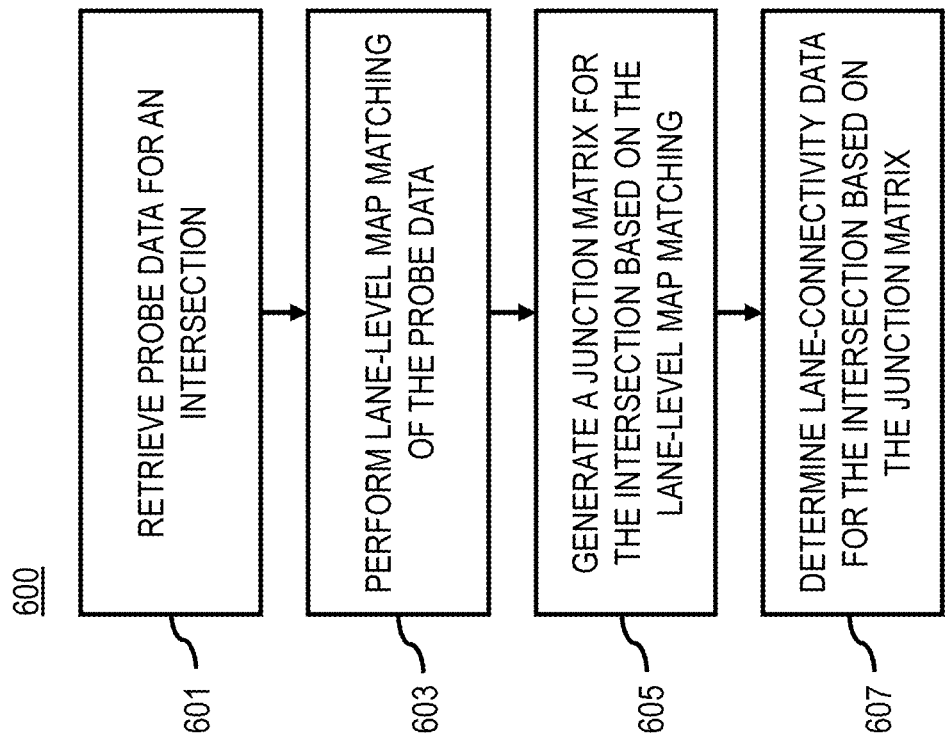
FIG. 6 is a flowchart of a process for predicting lane-connectivity at arterial intersections based on a LCJM, according to one embodiment.
Figure 11:
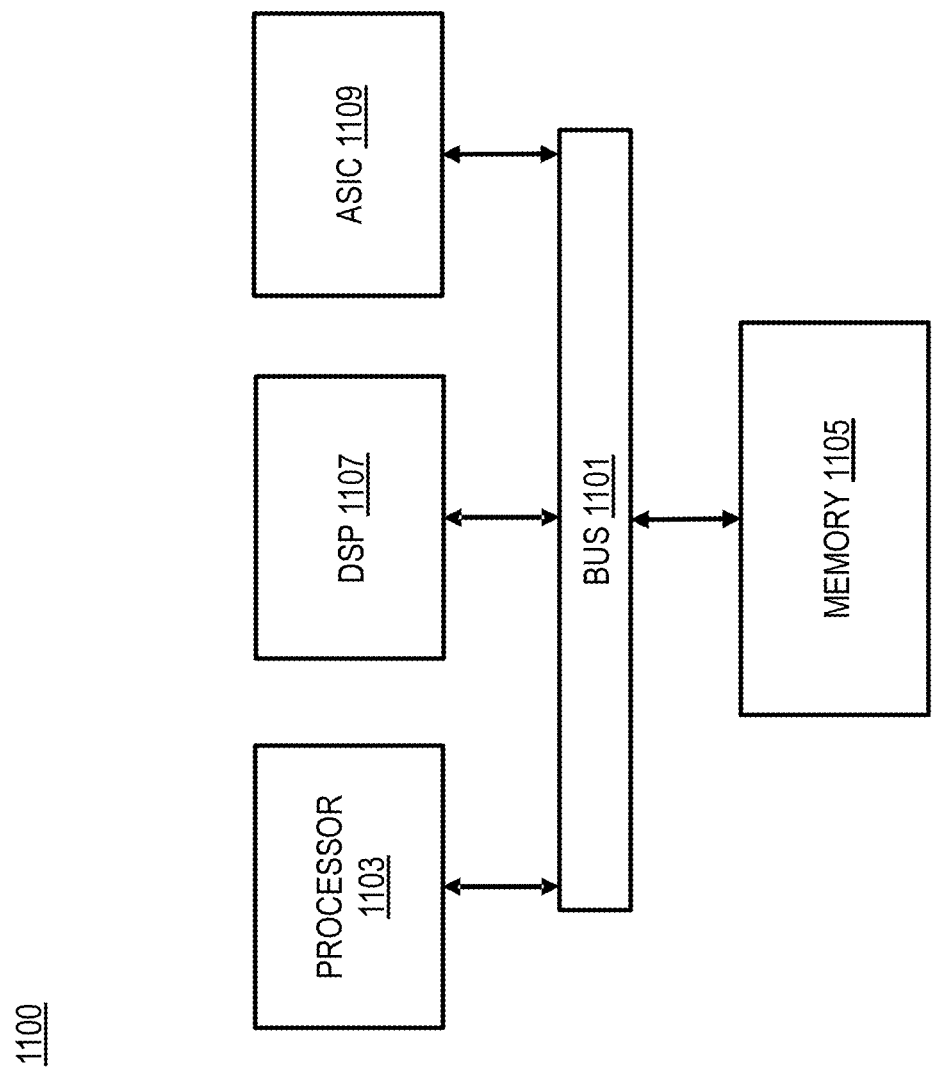
FIG. 11 is a diagram of a chip set that can be used to implement an embodiment of the invention.

FIG. 6 is a flowchart of a process for predicting lane-connectivity at arterial intersections based on a LCJM, according to one embodiment. In various embodiments, the mapping platform 103, the machine learning model 123, and/or the modules 501-509 may perform one or more portions of the process 600 and may be implemented in, for instance, a chip set including a processor and a memory as shown in FIG. 11. As such, the mapping platform 103, the machine learning model 123, and/or modules 501-509 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, the probe data module 601 retrieves probe data for an intersection (e.g., an arterial intersection) with at least one upstream road link and at least one downstream link. By way of example, the probe data comprises data indicating a position and/or heading of a probe device (e.g., a vehicle 101, a UE 117, or a combination thereof) traveling in a road network. In one embodiment, the probe data includes location probes collected by one or more sensors (e.g., location sensors 107) of a plurality of vehicles (e.g., vehicles 101) traveling through an intersection (e.g., intersection 109). In one instance, the probe data module 501 may store the retrieved probe data in the probe database 121, the geographic database 125, or a combination thereof. In one instance, the one or more sensors may be location sensors 107 (e.g., GPS sensors) or a UE 117 (e.g., a mobile device carried by a driver or a passenger).

In step 603, the map matching module 503 performs a lane-level map-matching of the probe data (e.g., historical and/or real-time probe data) to one or more upstream lanes of the at least one upstream road link, one or more downstream lanes of the at least one downstream link, or a combination thereof. In one instance, the map matching module 503 converts geo-coordinates of the collected probes based on the corresponding road segments. In one embodiment, the map matching module 503 can perform the LLMM by using historical raw GPS probe positions (e.g., retrieved by the probe data module 501 from the probe database 121) to create a layer abstraction over a map (e.g., the map 115) and then use that layer to generate lane probabilities of real-time probes based on their d-value, as described above.

In step 605, the feature extraction module 505 generates a junction matrix (e.g., an LCJM) for the intersection between the one or more upstream lanes of the at least one upstream road link and the one or more downstream lanes of the at least one downstream road link based on the lane-level map-matching of the probe data. By way of example, a JM can help to understand the interconnection (if any) between upstream and downstream roads and lanes at an intersection. In one embodiment, the feature extraction module 505 generates the JM such that each element of the JM corresponds to a combination of an originating upstream lane and an ending downstream lane determined from among one or more upstream lanes and one or more downstream lanes (e.g., in a road network). In one instance, the feature extraction module 505 determines a count, an average speed, a standard deviation, an average map-matching confidence, or a combination thereof of the probe data for each element of the JM.

In step 607, the machine learning model 123 determines lane-connectivity data for the intersection based on the junction matrix. In one embodiment, the lane-connectivity data indicates which of the one or more upstream lanes flows traffic into which of the one or more downstream lanes. In one instance, the lane-connectivity data may be further based on the count, the average speed, the standard deviation, the average map-matching confidence, or a combination thereof corresponding to the probe data of the LCJM. In one embodiment, the lane-connectivity information of the LCJM of step 605 may be stored in an artifact or an input that the machine learning module 123 can use as a reference in real time to predict the corresponding lanes associated average speeds through the given intersection in real-time. The ability to predict the corresponding lanes in real time through the machine learning model 123 is important because of the current deficiencies with lane-level map information and GPS technology.

In one embodiment, the storage module 507 stores the lane-connectivity data as an attribute of an intersection, an upstream link, a downstream link, or a combination thereof in a geographic database (e.g., the geographic database 125). In one instance, the communication module 509 provides the lane-connectivity data as an output for determining direction-based traffic data for the intersection, the at least one upstream link, the at least one downstream link, or a combination thereof.

In one embodiment, the feature extraction module 505 can determine a restricted driving maneuver (RDM) an intersection based on a probe count for a junction matrix. By way of example, if the feature extraction module 505 determines a relatively low count, the machine learning model 123 can determine that vehicles are prohibited from traveling through the intersection between respective upstream and downstream links (e.g., temporarily or permanently depending on the time epoch). In one instance, the feature extraction module 505 can determine one or more prominent lanes among the one or more upstream lanes, the one or more downstream lanes, or a combination thereof based on a relative count of the probe trajectory of the junction matrix. In one embodiment, wherein the probe data includes historical probe data and wherein the lane-connectivity data is historical lane-connectivity data, the feature extraction module 505 can process the real-time probe data based on the historical lane-connectivity data to determine real-time lane connectivity data for the given intersection.

Figure 7:
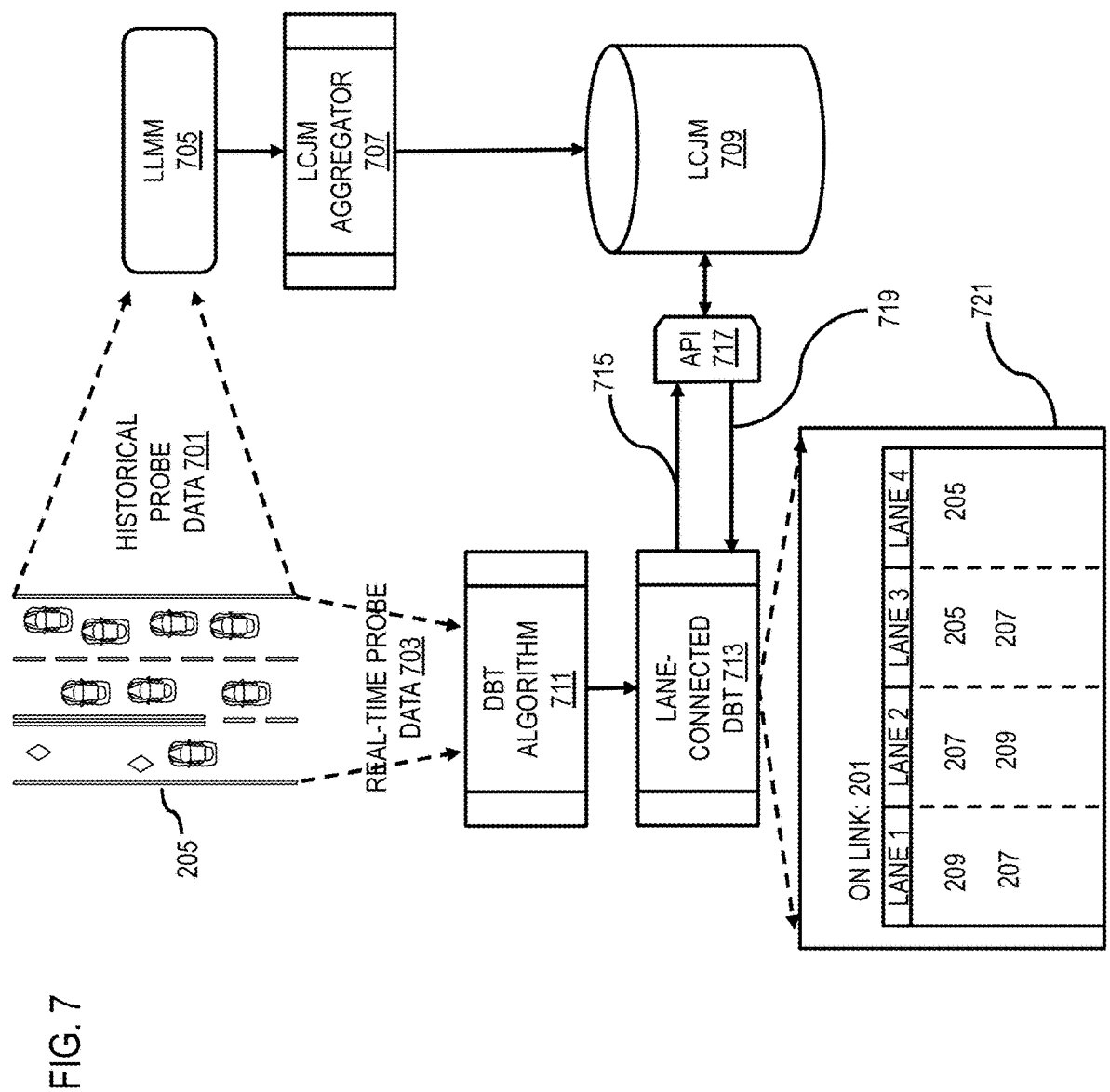
FIG. 7 is a diagram illustrating an example architecture for predicting lane-connectivity at arterial intersections in real time based on a LCJM, according to one embodiment.

FIG. 7 is a diagram illustrating an example architecture for predicting lane-connectivity at arterial intersections in real time based on a LCJM, according to one embodiment. In one embodiment, the data flow begins from collecting historical probe data 701 and real-time probe data 703 from vehicles 101, UEs 117, or a combination thereof traveling on an upstream link (e.g., link 201) of an arterial intersection. The historical probe data 701 is provided to a LLMM 705. The probe data (Link_ID, Lane_Number) is then transmitted from the LLMM 705 to the LCJM Aggregator 707. Next, the LCJM Aggregator 707 transmits the LCJM data (counter, avg. speed, STD, confidence) to the LCJM 709.

In one embodiment, the real-time probe data 703 is provided to a direction-based traffic (DBT) algorithm 711. The DBT algorithm 711 then transmits the DBT data (DBT-Link, downstream-Link, avg. speed, time) to the Lane-Connected DBT 713, which transmits a request 715 (DBT-Link, Link) to the Application Programming Interface (API) 717 and receives a response 719 (Lane 2, Lane 3) from the API 717. The API 717 also transmits information back and forth between itself and the LCJM 709. In one embodiment, the resultant DBT data (DBT-Link, Downstream-Link, avg. speed, and time) generates the output 721, which shows the connected upstream lanes and downstream links in real time.

Figure 8A:
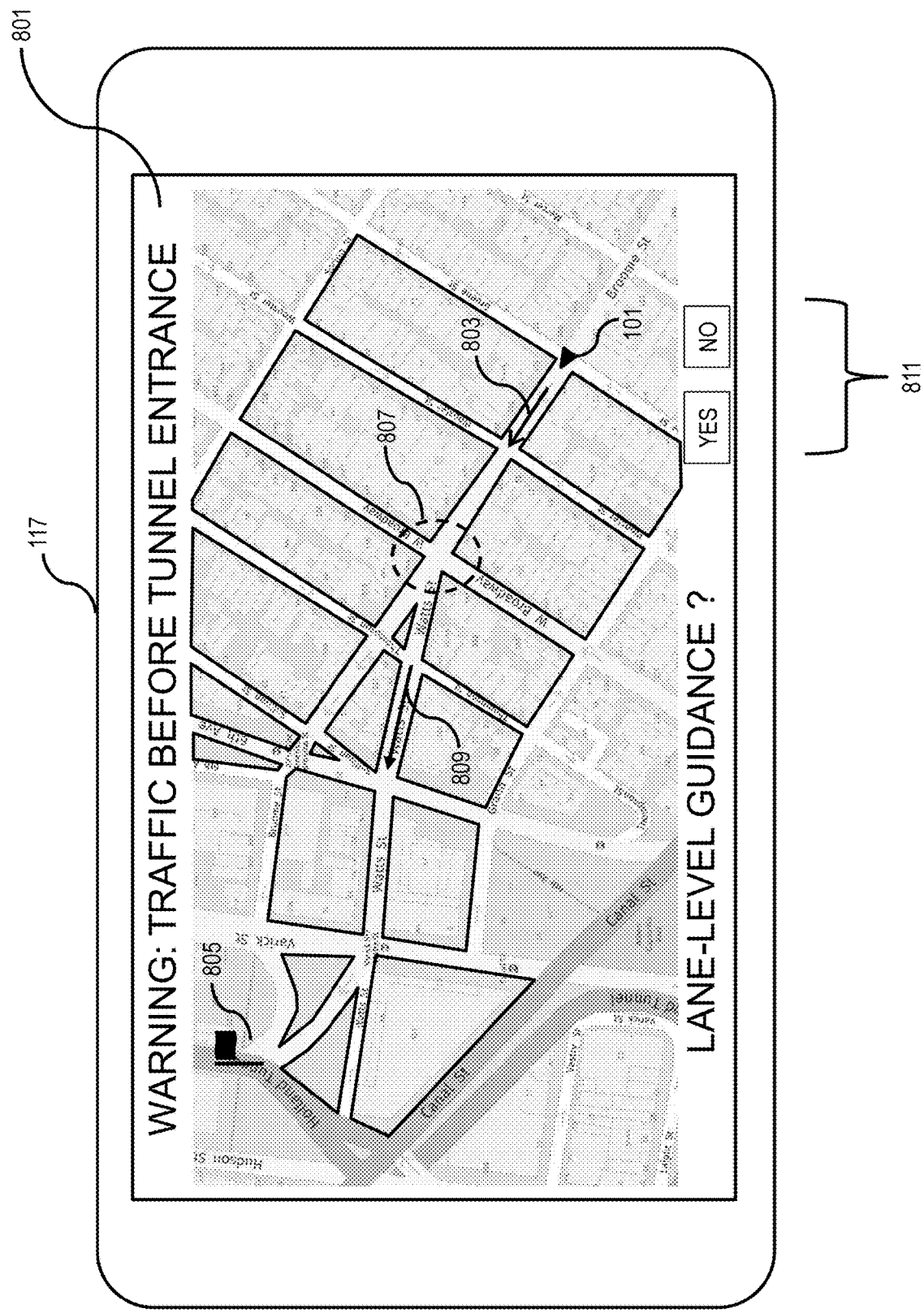
FIGS. 8A and 8B are diagrams of example user interfaces for predicting lane-connectivity at arterial intersections based on a LCJM, according to one embodiment.
Figure 8B:
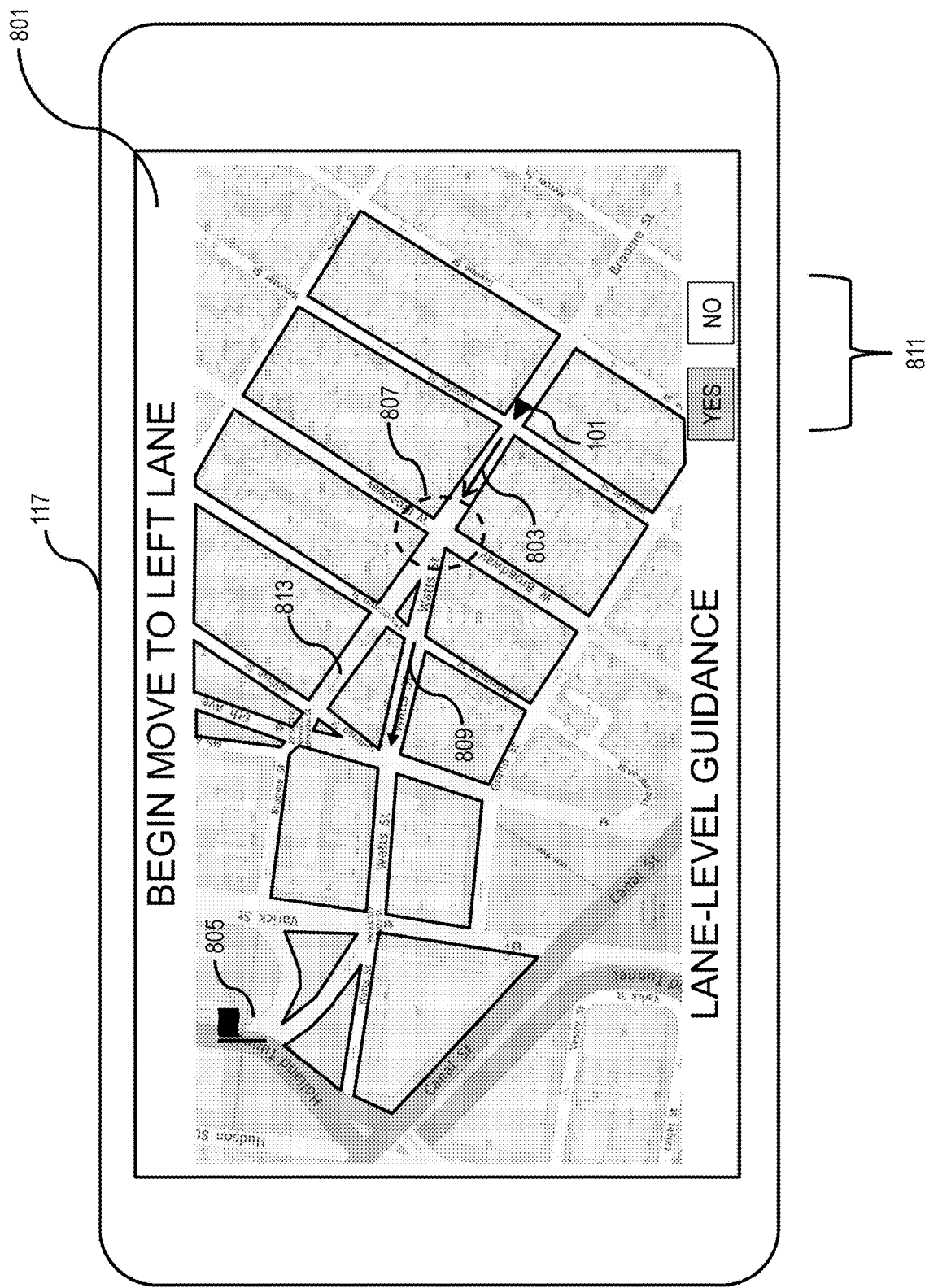

FIGS. 8A and 8B are diagrams of example user interfaces for predicting lane-connectivity at arterial intersections based on a LCJM, according to one embodiment. In this example, a UI 801 (e.g., a mapping application 119) is generated for a UE 117 (e.g., a mobile device, an embedded navigation system, etc.) that enables a user (e.g., a driver or a passenger) of a vehicle 101 to initiate a lane-connectivity prediction, as described above. For the example, a driver of a vehicle 101 may want guidance to know the best lane to drive in (e.g., a lane having the least amount of traffic and/or the most consistent traffic flow) and a passenger of an autonomous vehicle 101 may want to see her/his forthcoming route ahead of time to have trust that the vehicle 101 will be in the correct lane at the correct time. In this example, a user is driving a standard vehicle 101 (e.g., a car) on a Friday after work through a metropolitan city in route to an entrance of a tunnel leading out of the city.

In one embodiment, the system 100 can determine (e.g. based on real-time probe data) that the user is currently traveling on a multi-lane arterial link 803 in route to the destination 805 (e.g., an entrance of a tunnel). In one instance, the system 100 can also determine (e.g., based on historical probe data) that given the day of the week and the time of the day, the links between the user and the destination 805 will likely to be heavily congested, making lane changes more difficult. In one embodiment, the system 100 can determine that the time for the user to safely navigate the vehicle 101 to the correct lane of link 803 to reach the correct downstream link 809 through the intersection 807 (e.g., the far-left lane) will be dramatically reduced. Consequently, in one embodiment, the system 100 can generate the UI 801 such that it provides a user with a timely notification (e.g., "Warning: Traffic Before Tunnel Entrance"). By way of example, the system 100 may generate and/or provide the notification in the UI 801 based on probe data associated with the vehicle indicating that the vehicle is within a threshold proximity to the intersection, approaching traffic, or a combination thereof. In one embodiment, the system 100 can generate the UI 801 such that it includes one or more inputs 811 to enable a user to activate lane-level assistance while driving (e.g., when a user in a new or unknown area). In this instance, the user presses or taps the "yes" input 911, as depicted in FIG. 8B.

In one embodiment, based on the user interaction, the system 100 predicts lane-connectivity of the intersection 807, as described above. In one instance, the system 100 can also generate the UI 801 such that it provides the user with a timely notification (e.g., "begin move to left lane"). In this example, only the left lane of link 803 connects to the downstream link 809. In contrast, the right lane of link 803 leads to the downstream link 913, which does not connect to the destination 805 (e.g., the entrance of the tunnel). Consequently, the system 100 lane-connectivity prediction enables the user to drive on the fastest lane of link 803 (e.g., the lane with the least traffic) for as long as possible (e.g., a few blocks before the intersection 807) while at the same time ensuring that the user has a navigable connectivity to the downstream link 809 (e.g., moving into the left lane a block or two before the intersection 807).

Returning to FIG. 1, in one embodiment, the mapping platform 103 has connectivity over the communication network 105 to the services platform 127 (e.g., an OEM platform) that provides one or more services 129a-129n (collectivity referred to as services 129) (e.g., sensor data collection services). By way of example, the services 129 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 127 uses the output (e.g. lane-connectivity information) of the LCJM to provide services such as navigation, mapping, other location-based services, etc.

In one embodiment, the mapping platform 103 may be a platform with multiple interconnected components and may include multiple servers, intelligent networking devices, computing devices, components and corresponding software for predicting lane-connectivity at arterial intersections based on a LCJM. In addition, it is noted that the mapping platform 103 may be a separate entity of the system 100, a part of the one or more services 129, a part of the services platform 127, or included within the vehicles 101 (e.g., an embedded navigation system).

In one embodiment, content providers 131a-131m (collectively referred to as content providers 131) may provide content or data (e.g., including geographic data, sensor data, etc.) to the mapping platform 103, the UEs 117, the applications 119, the probe database 121, the geographic database 125, the services platform 127, the services 129, and the vehicles 101. The content provided may be any type of content, such as map content, textual content, audio content, video content, image content, etc. In one embodiment, the content providers 131 may provide content that may aid in localizing a vehicle on a lane of a digital map or link. In one embodiment, the content providers 131 may also store content associated with the mapping platform 103, the probe database 121, the geographic database 125, the services platform 127, the services 129, and/or the vehicles 101. In another embodiment, the content providers 131 may manage access to a central repository of data, and offer a consistent, standard interface to data, such as a repository of the geographic database 125.

By way of example, the UEs 117 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 117 can support any type of interface to the user (such as "wearable" circuitry, etc.). Also, the UEs 117 may be configured to access the communication network 105 by way of any known or still developing communication protocols. In one embodiment, the UEs 117 may include the mapping platform 103 to predict lane-connectivity at arterial intersections based on a LCJM.

In one embodiment, as previously stated, the vehicles 101 are configured with various sensors (e.g., location sensors 107) for generating or collecting vehicular sensor data, related geographic/map data, etc. In one embodiment, the sensed data represents sensor data associated with a geographic location or coordinates at which the sensor data was collected. In one embodiment, the probe data (e.g., stored in the probe database 121) includes location probes collected by one or more location sensors 107. In this way, the sensor data can act as observation data that can be aggregated into location-aware training and evaluation data sets (e.g., an artifact or input) for use by the machine learning model 123. By way of example, the location sensors 107 may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, etc.) that travel through on arterial road or links.

Other examples of sensors 107 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel, moisture sensors, pressure sensors, etc. In a further example embodiment, sensors 107 about the perimeter of the vehicle 101 may detect the relative distance of the vehicle 101 from a physical divider, a lane line of a link 111 or roadway, the presence of other vehicles, pedestrians, traffic lights, potholes and any other objects, or a combination thereof. In one scenario, the location sensors 107 may detect weather data, traffic information, or a combination thereof. In one embodiment, the vehicles 101 may include GPS or other satellite-based receivers 107 to obtain geographic coordinates from satellites 133 for determining current location and time. Further, the location can be determined by visual odometry, triangulation systems such as A-GPS, Cell of Origin, or other location extrapolation technologies.

In one embodiment, the UEs 117 may also be configured with various sensors (not shown for illustrative convenience) for acquiring and/or generating probe data associated with a vehicle 101, a driver, other vehicles, conditions regarding the driving environment or roadway, etc. For example, such sensors may be used as GPS receivers for interacting with the one or more satellites 133 to determine and track the current speed, position and location of a vehicle 101 travelling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 117. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 105 as probe data (e.g., GPS probe data) according to any known wireless communication protocols. For example, each UE 117, application 119, user, and/or vehicle 101 may be assigned a unique probe identifier (probe ID) for use in reporting or transmitting said probe data collected by the vehicles 101 and UEs 117. In one embodiment, each vehicle 101 and/or UE 117 is configured to report probe data as probe points, which are individual data records collected at a point in time that records telemetry data. Probes or probe points can be collected by the system 100 from the UEs 117, applications 119, probe database 121, and/or vehicles 101 in real-time, in batches, continuously, or at any other frequency requested by the system 100 over, for instance, the communication network 105 for processing by the mapping platform 103, machine learning model 123, or a combination thereof.

In one embodiment, the mapping platform 103 retrieves aggregated probe points gathered and/or generated by UE 117 resulting from the travel of UEs 117 and/or vehicles 101 on a road segment through an intersection. In one instance, the probe database 121 stores a plurality of probe points and/or trajectories generated by different UEs 117, applications 119, vehicles 101, etc. over a period while traveling in a monitored area. A time sequence of probe points specifies a trajectory—i.e., a path traversed by a UE 117, application 119, vehicle 101, etc. over the period.

In one embodiment, the communication network 105 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, the mapping platform 103, the UEs 117, the application 119, services platform 127, services 129, content providers 131, and/or satellites 133 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
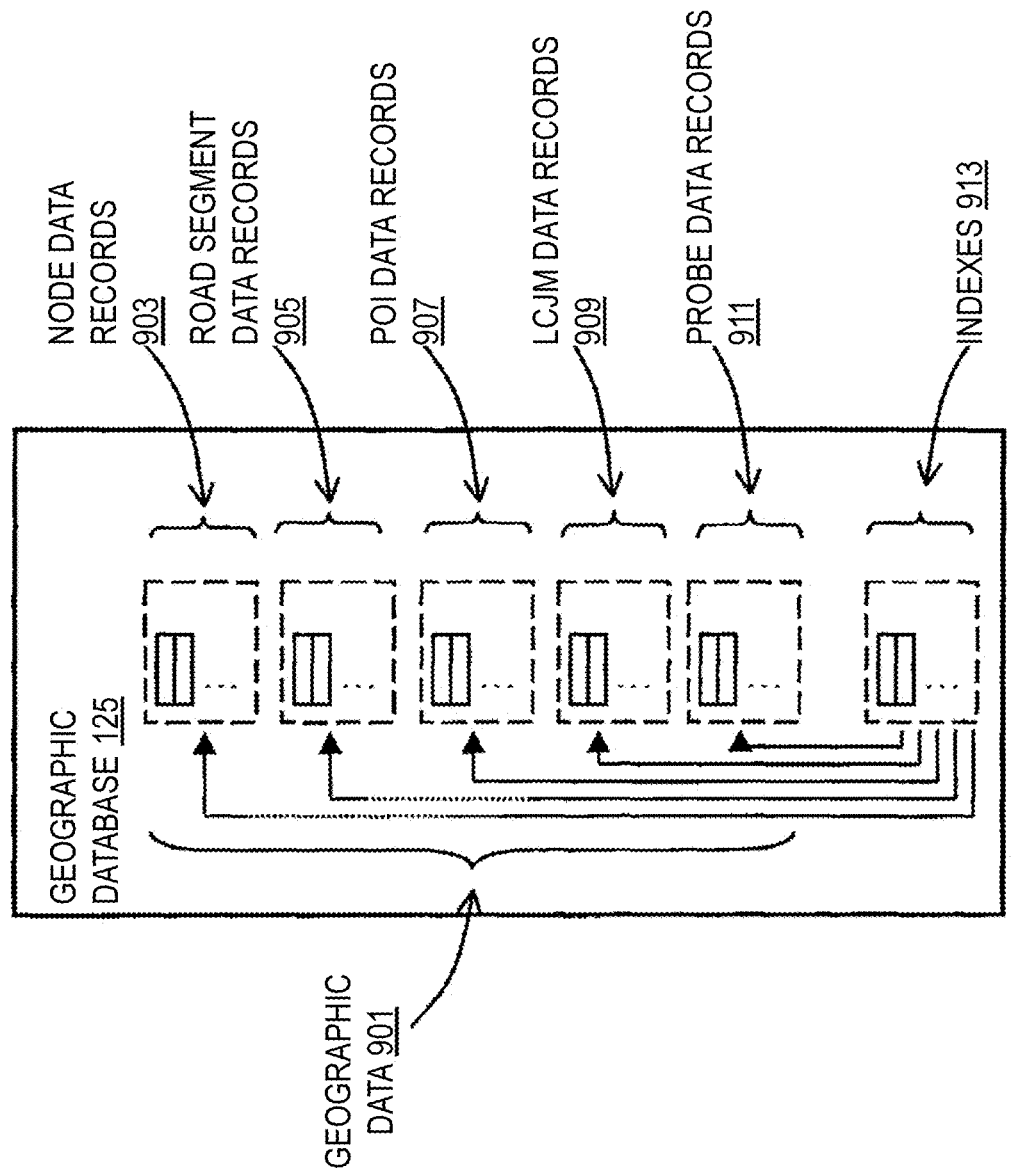
FIG. 9 is a diagram of a geographic database, according to one embodiment.

FIG. 9 is a diagram of the geographic database 125, according to one embodiment. In the exemplary embodiments, modal routes, trajectories (sequences of probe points), road segments, lane model information and/or other related information can be stored, associated with, and/or linked to the geographic database 125 or data thereof. In one embodiment, the geographic database 125 includes geographic data 901 used for (or configured to be compiled to be used for) mapping and/or navigation-related services, such as for personalized route determination, according to exemplary embodiments. For example, the geographic database 125 includes node data records 903, road segment or link data records 905, POI data records 907, lane-connectivity junction matrix (LCJM) data records 909, and probe data records 911, for example. More, fewer or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques), for example. In one embodiment, one or more portions of the trajectories may be used to generate a LCJM used to determine lane-connectivity data or information as described above.

In exemplary embodiments, the road segment data records 905 are links or segments representing roads (e.g., arterial roads), streets, or paths, as can be used in the calculated route or recorded route information for determination of one or more personalized routes, according to exemplary embodiments. The node data records 903 are end points corresponding to the respective links or segments of the road segment data records 905. The road link data records 905 and the node data records 903 represent a road network, such as used by vehicles, cars, and/or other entities. Alternatively, the geographic database 125 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 907. The geographic database 125 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In addition, the geographic database 125 can include the LCJM data records 909. By way of example, the LCJM data records 909 may include probe count, average speed, standard deviation, average map-matching confidence, etc. corresponding to real-time probe trajectories through a given arterial intersection. In one embodiment, the LCJM data records 909 may also include lane-connectivity between upstream lanes and downstream lanes of a road network for subsequent retrieval or access by the machine learning model 123. In addition, trajectory and/or probe data processed by the system 100 can be stored in the probe data records 911. For example, lane distances, lateral positions (d-value), reference lines, etc. can be stored in the probe data records 911 for later retrieval or access.

The geographic database 125 can be maintained by the content providers 131 in association with the services platform 127 (e.g., a map developer). The map developer can collect geographic data to generate and enhance the geographic database 125. There can be different ways used by the map developer to collect data. These ways can include obtaining data from other sources, such as municipalities or respective geographic authorities. In addition, the map developer can employ field personnel to travel by vehicle (e.g., vehicles 101) along roads throughout the geographic region to observe features and/or record information about them, for example. Also, remote sensing, such as aerial or satellite photography, can be used.

The geographic database 125 can be a master geographic database stored in a format that facilitates updating, maintenance, and development. For example, the master geographic database 125 or data in the master geographic database 125 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 125 can be a master geographic database, but in alternate embodiments, the geographic database 125 can represent a compiled navigation database that can be used in or with end user devices (e.g., vehicles 101, UEs 117, etc.) to provide navigation-related functions. For example, the geographic database 125 can be used with the end user device to provide an end user with navigation features (e.g., lane-level guidance). In such a case, the geographic database 125 can be downloaded or stored on the end user device (e.g., vehicle 101, UE 117, etc.), such as in an application 119, or the end user device can access the geographic database 125 through a wireless or wired connection (such as via a server and/or the communication network 105), for example.

The processes described herein for predicting lane-connectivity at arterial intersections based on a LCJM may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
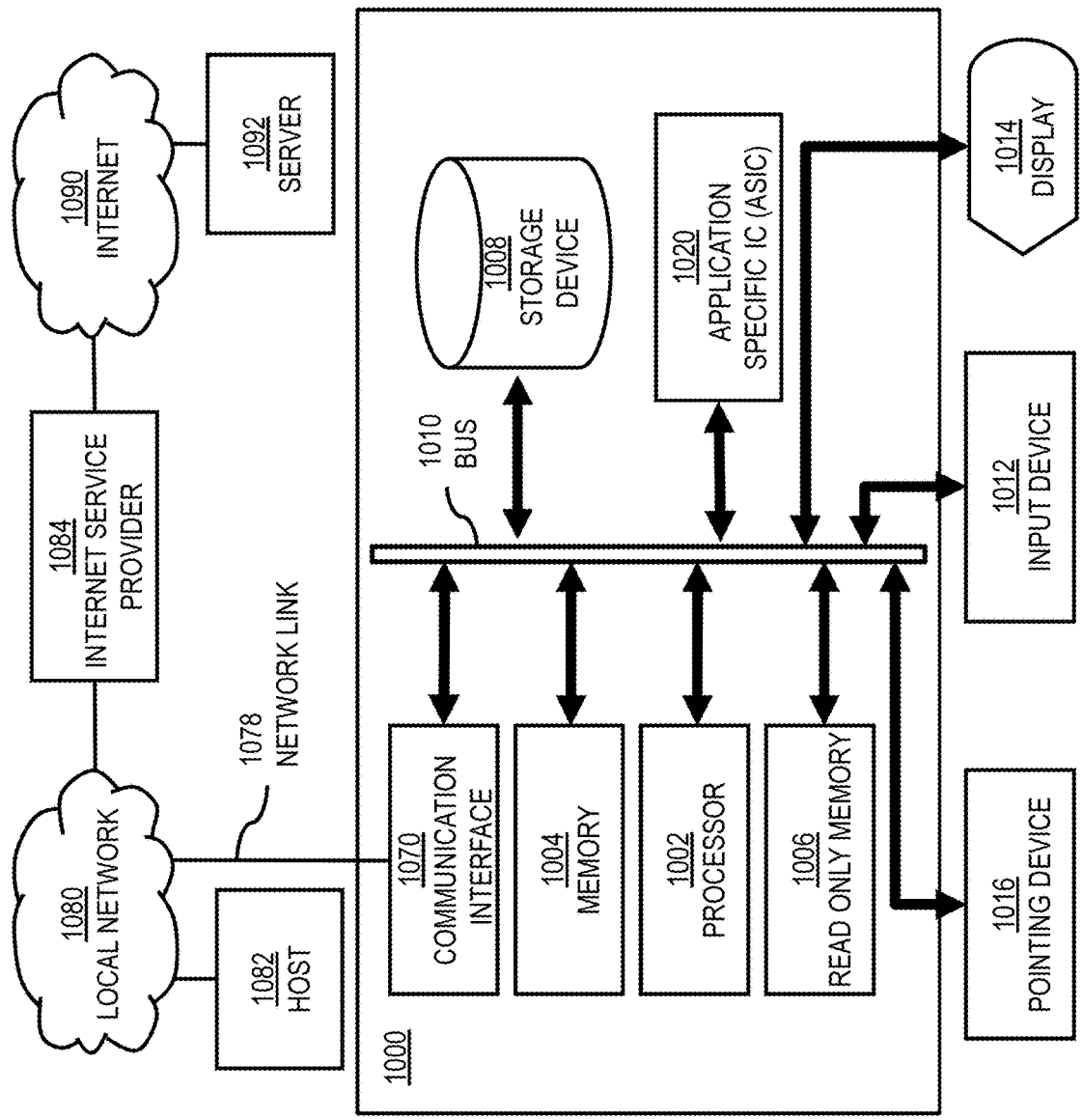
FIG. 10 is a diagram of hardware that can be used to implement an embodiment of the invention.

FIG. 10 illustrates a computer system 1000 upon which an embodiment may be implemented. Computer system 1000 is programmed (e.g., via computer program code or instructions) to predict lane-connectivity at arterial intersections based on a LCJM as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to predicting lane-connectivity at arterial intersections based on a LCJM. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random-access memory (RANI) or other dynamic storage device, stores information including processor instructions for predicting lane-connectivity at arterial intersections based on a LCJM. Dynamic memory allows information stored therein to be changed by the computer system 1000. RANI allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for predicting lane-connectivity at arterial intersections based on a LCJM, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for predicting lane-connectivity at arterial intersections based on a LCJM.

The term non-transitory computer-readable medium is used herein to refer to any medium that participates in providing information to processor 1002, including instructions for execution. Such a medium may take many forms, including, but not limited to, non-volatile media, volatile media and transmission media. Non-volatile or non-transitory media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in FIG. 5), cause an apparatus (e.g., the vehicles 101, the UEs 105, the mapping platform 103, etc.) to perform any steps of the various embodiments of the methods described herein.

FIG. 11 illustrates a chip set 1100 upon which an embodiment may be implemented. Chip set 1100 is programmed to predict lane-connectivity at arterial intersections based on a LCJM as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to predict lane-connectivity at arterial intersections based on a LCJM. The memory 1105 also stores the data associated with or generated by the execution of the inventive steps.

Figure 12:
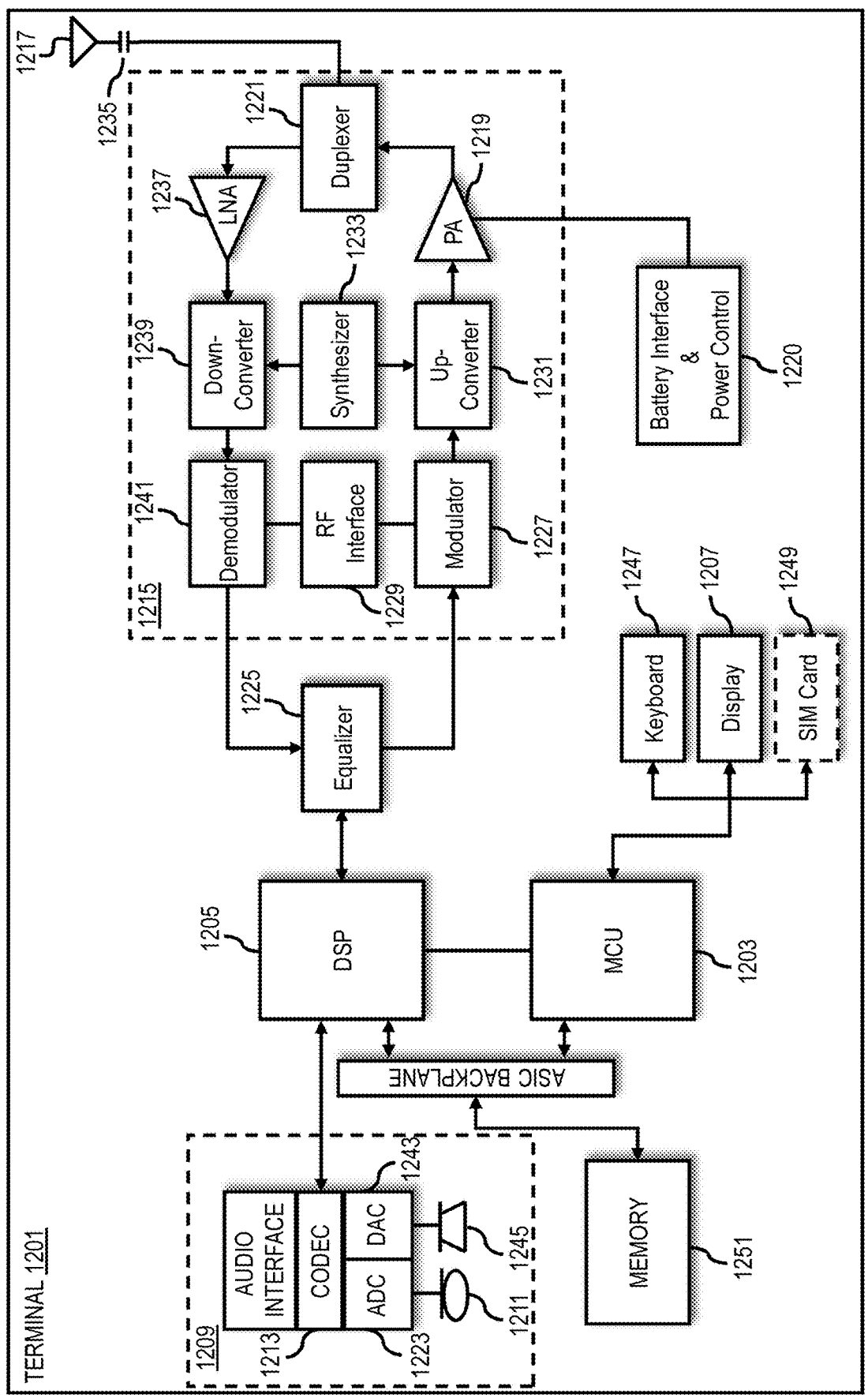
FIG. 12 is a diagram of a mobile terminal (e.g., handset or vehicle or part thereof) that can be used to implement an embodiment of the invention.

FIG. 12 is a diagram of exemplary components of a mobile terminal 1201 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), WiFi, satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to predict lane-connectivity at arterial intersections based on a LCJM. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable non-transitory computer readable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   retrieving probe data for an intersection with at least one upstream road link and at least one downstream link, wherein the probe data is collected from one or more sensors of a plurality of vehicles traveling through the intersection;
   performing a lane-level map-matching of the probe data to one or more upstream lanes of the at least one upstream road link, one or more downstream lanes of the at least one downstream link, or a combination thereof;
   generating a junction matrix for the intersection between the one or more upstream lanes of the at least one upstream road link and the one or more downstream lanes of the at least one downstream road link based on the lane-level map-matching of the probe data;
   determining lane-connectivity data for the intersection based on the junction matrix; and
   providing the lane-connectivity data as an output for performing at least one of:

controlling a vehicle, routing a vehicle, generating digital map data of a geographic database, or providing navigation guidance on a device.

2. The method of claim 1, wherein the lane-connectivity data indicates which of the one or more upstream lanes flows traffic into which of the one or more downstream lanes, further comprising:

predicting the lanes of the at least one upstream road link and the at least one downstream link based on traffic speed detected using direction-based traffic (DBT) of real-time probe data.

3. The method of claim 1, further comprising:

storing the lane-connectivity data as an attribute of the intersection, the at least one upstream link, the at least one downstream link, or a combination thereof in the geographic database.

4. The method of claim 1, further comprising:

providing the lane-connectivity data as an output for determining direction-based traffic data for the intersection, the at least one upstream link, the at least one downstream link, or a combination thereof.

5. The method of claim 1, wherein each element of the junction matrix corresponds to a combination of an originating upstream lane and an ending downstream lane determined from among the one or more upstream lanes and the one or more downstream lanes, and wherein the junction matrix is a reference for real-time predictions of a most probable lane of an upstream link that a vehicle traveled prior to traveling through the intersection to a downstream link.

6. The method of claim 5, further comprising:

determining a count, an average speed, a standard deviation, an average map-matching confidence, or a combination thereof of the probe data corresponding to said each element, wherein the lane-connectivity data is further based on the count, the average speed, the standard deviation, the average map-matching confidence, or a combination thereof.

7. The method of claim 1, further comprising:

determining a restricted driving maneuver for the intersection based on a count of the probe data for one or more elements of the junction matrix.

8. The method of claim 1, further comprising:

determining one or more prominent lanes among the one or more upstream lanes, the one or more downstream lanes, or a combination thereof based on a relative count of the probe trajectory among different elements of the junction matrix.

9. The method of claim 1, wherein the probe data includes historical probe data and wherein the lane-connectivity data is historical lane-connectivity data, the method further comprising:

processing real-time probe data based on the historical lane-connectivity data to determine real-time lane connectivity data for the intersection.

10. An apparatus comprising:

at least one processor; and at least one memory including computer program code for one or more programs, the at least one memory and the computer program code configured to, with the at least one processor, cause the apparatus to perform at least the following, retrieve probe data for an intersection with at least one upstream road link and at least one downstream link, wherein the probe data is collected from one or more sensors of a plurality of vehicles traveling through the intersection;

perform a lane-level map-matching of the probe data to one or more upstream lanes of the at least one upstream road link, one or more downstream lanes of the at least one downstream link, or a combination thereof;

generate a junction matrix for the intersection between the one or more upstream lanes of the at least one upstream road link and the one or more downstream lanes of the at least one downstream road link based on the lane-level map-matching of the probe data;

determine lane-connectivity data for the intersection based on the junction matrix; and provide the lane-connectivity data as an output for performing at least one of:

controlling a vehicle, routing a vehicle, generating digital map data of a geographic database, or providing navigation guidance on a device.

11. The apparatus of claim 10, wherein the lane-connectivity data indicates which of the one or more upstream lanes flows traffic into which of the one or more downstream lanes, wherein the apparatus is further caused to:

predict the lanes of the at least one upstream road link and the at least one downstream link based on traffic speed detected using direction-based traffic (DBT) of real-time probe data.

12. The apparatus of claim 10, wherein the apparatus is further caused to:

store the lane-connectivity data as an attribute of the intersection, the at least one upstream link, the at least one downstream link, or a combination thereof in the geographic database.

13. The apparatus of claim 10, wherein the apparatus is further caused to:

provide the lane-connectivity data as an output for determining direction-based traffic data for the intersection, the at least one upstream link, the at least one downstream link, or a combination thereof.

14. The apparatus of claim 10, wherein each element of the junction matrix corresponds to a combination of an originating upstream lane and an ending downstream lane determined from among the one or more upstream lanes and the one or more downstream lanes, and wherein the junction matrix is a reference for real-time predictions of a most probable lane of an upstream link that a vehicle traveled prior to traveling through the intersection to a downstream link.

15. The apparatus of claim 14, wherein the apparatus is further caused to:

determine a count, an average speed, a standard deviation, an average map-matching confidence, or a combination thereof of the probe data corresponding to said each element, wherein the lane-connectivity data is further based on the count, the average speed, the standard deviation, the average map-matching confidence, or a combination thereof.

16. A non-transitory computer-readable storage medium, carrying one or more sequences of one or more instructions which, when executed by one or more processors, cause an apparatus to at least perform the following steps:

retrieving probe data for an intersection with at least one upstream road link and at least one downstream link, wherein the probe data is collected from one or more sensors of a plurality of vehicles traveling through the intersection;

performing a lane-level map-matching of the probe data to one or more upstream lanes of the at least one upstream road link, one or more downstream lanes of the at least one downstream link, or a combination thereof;

generating a junction matrix for the intersection between the one or more upstream lanes of the at least one upstream road link and the one or more downstream lanes of the at least one downstream road link based on the lane-level map-matching of the probe data;

determining which one of the one or more upstream lanes flows traffic into which of the one or more downstream lanes based on the junction matrix; and providing the lane-connectivity data as an output for performing at least one of:

controlling a vehicle, routing a vehicle, generating digital map data of a geographic database, or providing navigation guidance on a device.

17. The non-transitory computer-readable storage medium of claim 16, wherein which of the one or more upstream lanes flows traffic into which of the one or more downstream lanes comprises lane-connectivity data.

18. The non-transitory computer-readable storage medium of claim 17, wherein the apparatus is further caused to perform:

storing the lane-connectivity data as an attribute of the intersection, the at least one upstream link, the at least one downstream link, or a combination thereof in the geographic database.

19. The non-transitory computer-readable storage medium of claim 17, wherein the apparatus is further caused to perform:

providing the lane-connectivity data as an output for determining direction-based traffic data for the intersection, the at least one upstream link, the at least one downstream link, or a combination thereof.

20. The method of claim 1, wherein the lane-level map-matching further comprising:

processing historical raw GPS probe positions to create a layer abstraction over a map; and applying the layer abstraction to generate lane probabilities of real-time probes based on their d-value.

* * * * *